(12) United States Patent
Cheng et al.

(10) Patent No.: US 8,382,386 B2
(45) Date of Patent: Feb. 26, 2013

(54) PHOTOGRAPHIC DEVICE

(75) Inventors: Szu-Hsing Cheng, New Taipei (TW); Chih-Hui Hsu, New Taipei (TW)

(73) Assignee: Vivotek Inc., New Taipei (TW)

( * ) Notice: Subject to any disclaimer, the term of this patent is extended or adjusted under 35 U.S.C. 154(b) by 104 days.

(21) Appl. No.: 13/176,460

(22) Filed: Jul. 5, 2011

(65) Prior Publication Data
US 2012/0008935 A1  Jan. 12, 2012

(30) Foreign Application Priority Data
Jul. 7, 2010 (TW) ................................ 99213004 U

(51) Int. Cl.
*G03B 17/00* (2006.01)
(52) U.S. Cl. ....................................................... 396/427
(58) Field of Classification Search .................. 396/427; 348/143
See application file for complete search history.

(56) References Cited

U.S. PATENT DOCUMENTS

| 6,268,882 B1* | 7/2001 | Elberbaum | 348/151 |
| 6,637,952 B2* | 10/2003 | Arbuckle et al. | 396/427 |
| 6,721,501 B2* | 4/2004 | Komatsu | 396/429 |
| 2010/0272427 A1* | 10/2010 | Jung et al. | 396/427 |
| 2012/0008935 A1* | 1/2012 | Cheng et al. | 396/535 |

* cited by examiner

*Primary Examiner* — W. B. Perkey
(74) *Attorney, Agent, or Firm* — Morris Manning & Martin LLP; Tim Tingkang Xia, Esq.

(57) ABSTRACT

A photographic device includes an upper cover component, a lens module, a signal line set, a circuit board, and a lower cover. The upper cover component comprises an upper casing having a through hole and a transparent mask. The transparent mask is fastened under the through hole and exposed by it and does not protrude from an outer surface of the upper casing. The lens module has a photographic lens facing the mask. The signal line set has a fixing end fastened to one end of the upper casing. The circuit board is electrically connected to the lens module and the signal line set. The lower cover and the upper casing are joined and enclose the lens module and the circuit board. As the transparent mask does not protrude from the outer surface of the upper casing, cracks of the transparent mask caused by a foreign object can be prevented.

10 Claims, 6 Drawing Sheets

PHOTOGRAPHIC DEVICE

CROSS-REFERENCE TO RELATED APPLICATIONS

This non-provisional application claims priority under 35 U.S.C. §119(a) on Patent Application No(s). 099213004 filed in Taiwan, R.O.C. on Jul. 7, 2010, the entire contents of which are hereby incorporated by reference.

BACKGROUND

1. Technical Field

The present disclosure relates to a photographic device, and more particularly, to a photographic device for preventing damages.

2. Related Art

A conventional photographic device is mounted at a particular position on an indoor ceiling, an indoor wall, or an outdoor wall, for photographing an indoor or outdoor scene at a particular view angle. The conventional photographic device has a lens module, a circuit board, a signal line set, an upper casing, and a lower casing. The upper casing has an optical spherical mask generally made of plastic and protruding from an outer surface of the upper casing, and the lens module is accommodated in the optical spherical mask. The circuit board is connected respectively to the lens module and the signal line set, so that an electrical connection relation exists among one another. The lower casing is joined to the upper casing by which the lens module and the circuit board are encompassed.

Generally, the conventional photographic device is mounted on an indoor ceiling by the following steps. First, the lower casing is fixed to the ceiling with the circuit board and the lens module fixed to the lower casing. Signal connection is established between the signal line set and a photographic system. Then, the view angle of a lens of the lens module is adjusted to a preset position, and the upper casing is fixed to the lower casing, so that the optical spherical mask encloses the lens for protection.

However, the optical spherical mask of the conventional photographic device protrudes from the upper casing, and, therefore, is easier to be damaged from collision, man-made impact or hit with a tool. The lens module under the optical spherical mask is even damaged accordingly. In addition, as the photographic device has no water-proof structure and dust-proof structure, water drops may cover the inner surface of the optical spherical mask due to the existence of the moisture in the fixed photographic device. Also, a layer of dust may cover the inner surface of the optical spherical mask due to the entering of the dust particles into the photographic device. Therefore, such water drops and the layer of dust may lower the quality of the photographed picture. Moreover, even short circuit may be caused by the attachment of the water drops and the dust onto a circuit unit in the photographic device, causing the decrease of the service life of the photographic device.

SUMMARY

In view of the above problems, the disclosure provides a photographic device to prevent the problem of the lens in the optical spherical mask of the conventional photographic device being easier to be damaged due to the collision by a foreign object or man-made impact. Also, the disclosure can prevent the problem of the low photograph quality and the decreasing service life of a conventional photographic device due to the influence on the photographic device by the moisture and dust.

According to an embodiment, the disclosure provides a photographic device, which comprises an upper cover component, a lens module, a signal line set, a circuit board, and a lower cover. The upper cover component comprises a transparent mask and, an upper casing having an elongated through hole, and the transparent mask is fastened in the upper casing and disposed under the through hole. The through hole exposes the transparent mask, and the transparent mask does not protrude from an outer surface of the upper casing. In addition, the lens module has a photographic lens facing the transparent mask, and the photographic lens may be adjusted for a view angle thereof within an elongated breach range of the through hole. The signal line set has a fixed portion fastened to one end of the upper casing. The circuit board is respectively electrically connected to the lens module and the signal line set. The circuit board and the lens module are fastened to the lower cover which is joined to the upper casing, and the lower cover and the upper casing jointly encompass the lens module and the circuit board.

As the upper casing of the photographic device is made of high impact-resistant material, for example, an aluminum alloy, the upper casing is firm and not easy to be destroyed in nature. In addition, the transparent mask is located under the through hole of the upper casing. The size of the through hole is according to the range of the view angle of the lens module, and the transparent mask does not protrude from the outer surface of the upper casing. Accordingly, the upper casing can prevent the transparent mask from being impacted, and, therefore, broken by a force, thereby protecting the lens in the transparent mask. In addition, the photographic device may has a water-proof member, for example, a water-proof rubber, so that the connection slits between the upper casing and the transparent mask, the upper casing and the lower cover, and the upper casing and the signal line set can be sealed. Then the photographic device can be ensured that the space enclosed by the upper cover component and the lower cover is a sealed space in which the lens module and the circuit board are located. In this way, such sealed space can provide a water-proof effect and a dust-proof effect to the photographic device to prevent the decrease of the photograph quality due to the accumulation of moisture or dust on an inner surface of the transparent mask. Also, the sealed space prevents the damage caused by the direct contact of the moisture and the dust with a circuit unit in the photographic device, thereby improving the service life of the photographic device.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1A:
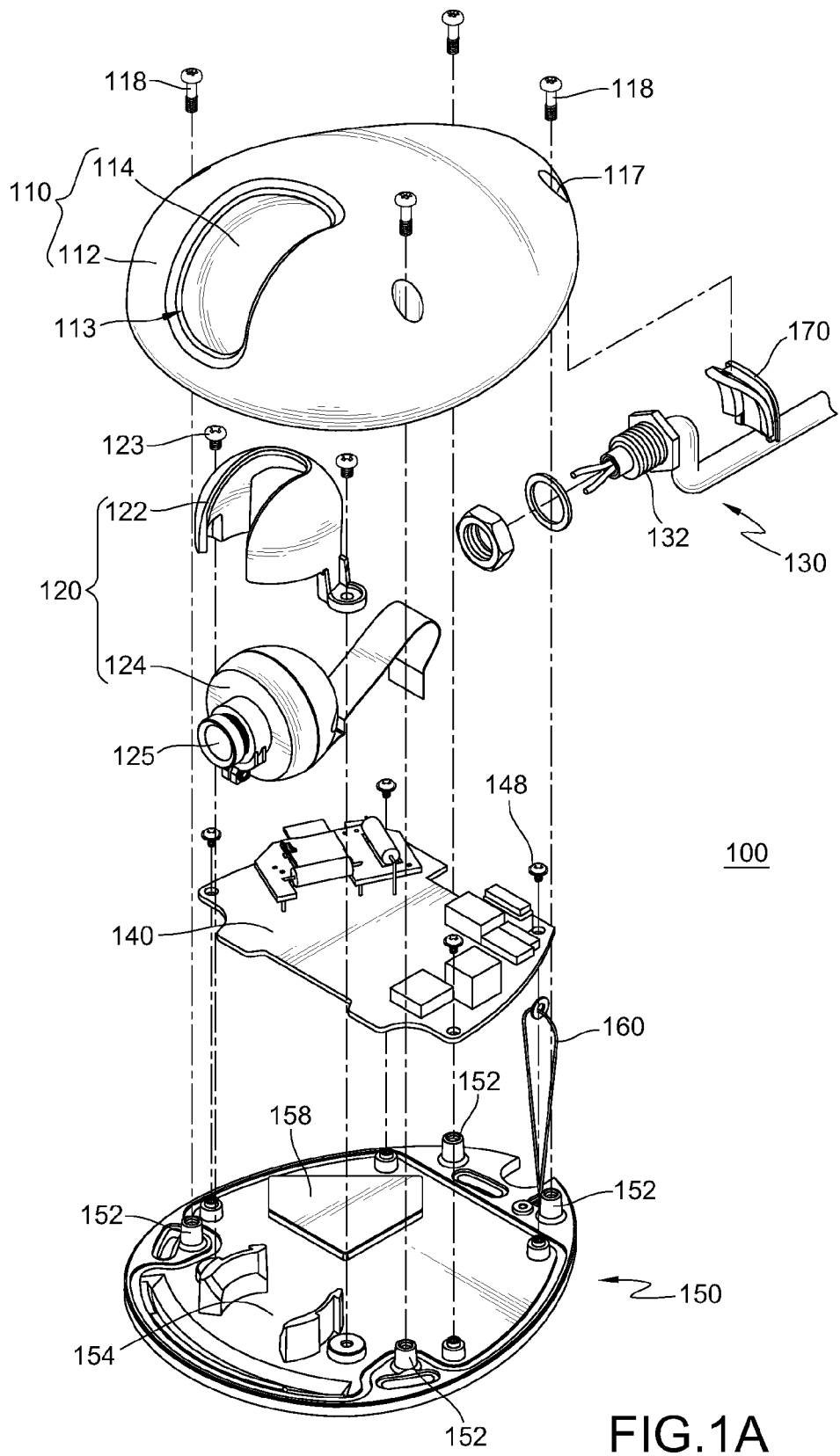
FIG. 1A is an exploded three-dimensional structural view of a photographic device according to an embodiment.
Figure 1B:
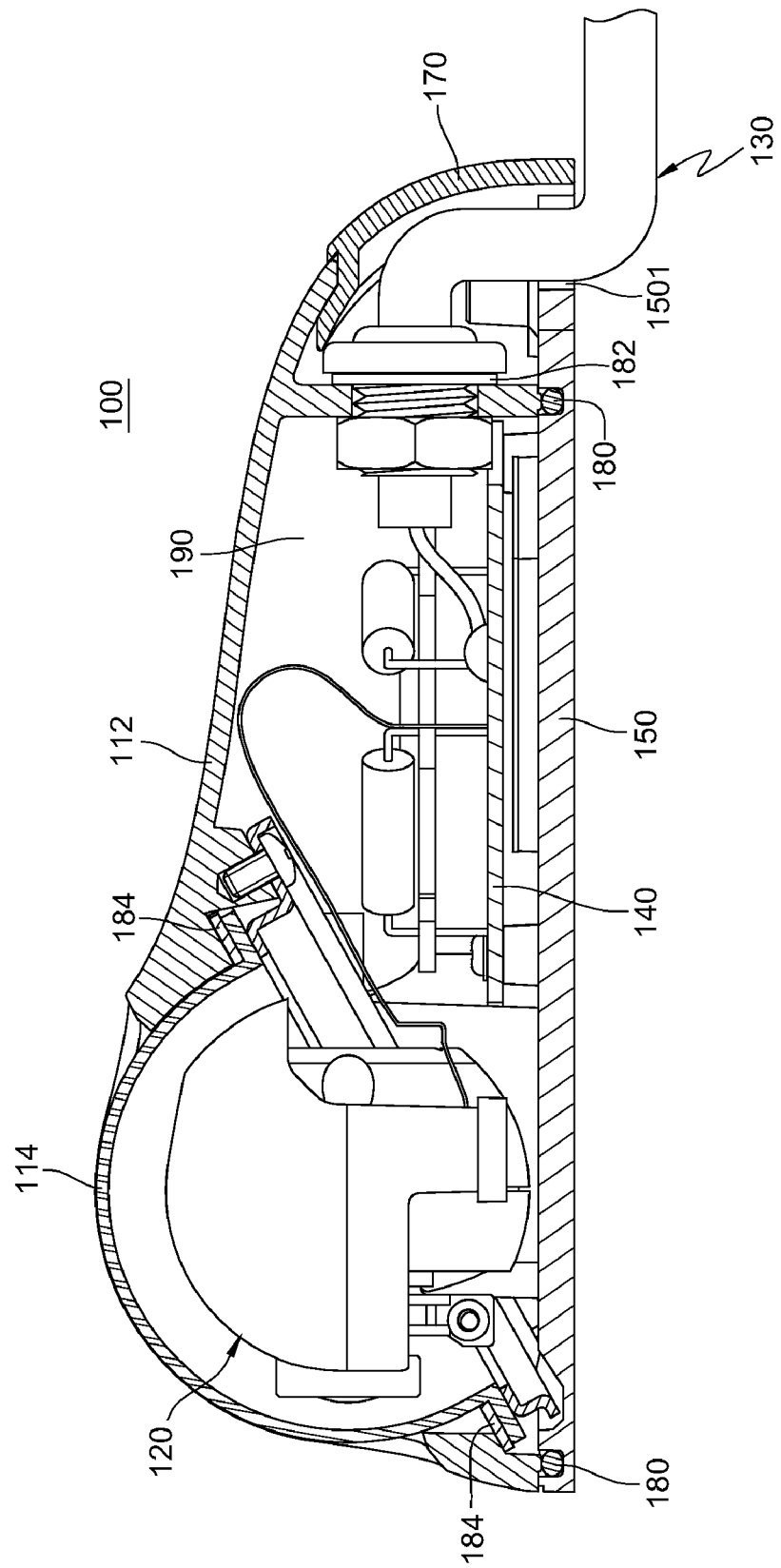
FIG. 1B is a sectional view of the photographic device as shown in FIG. 1A.
Figure 1C:
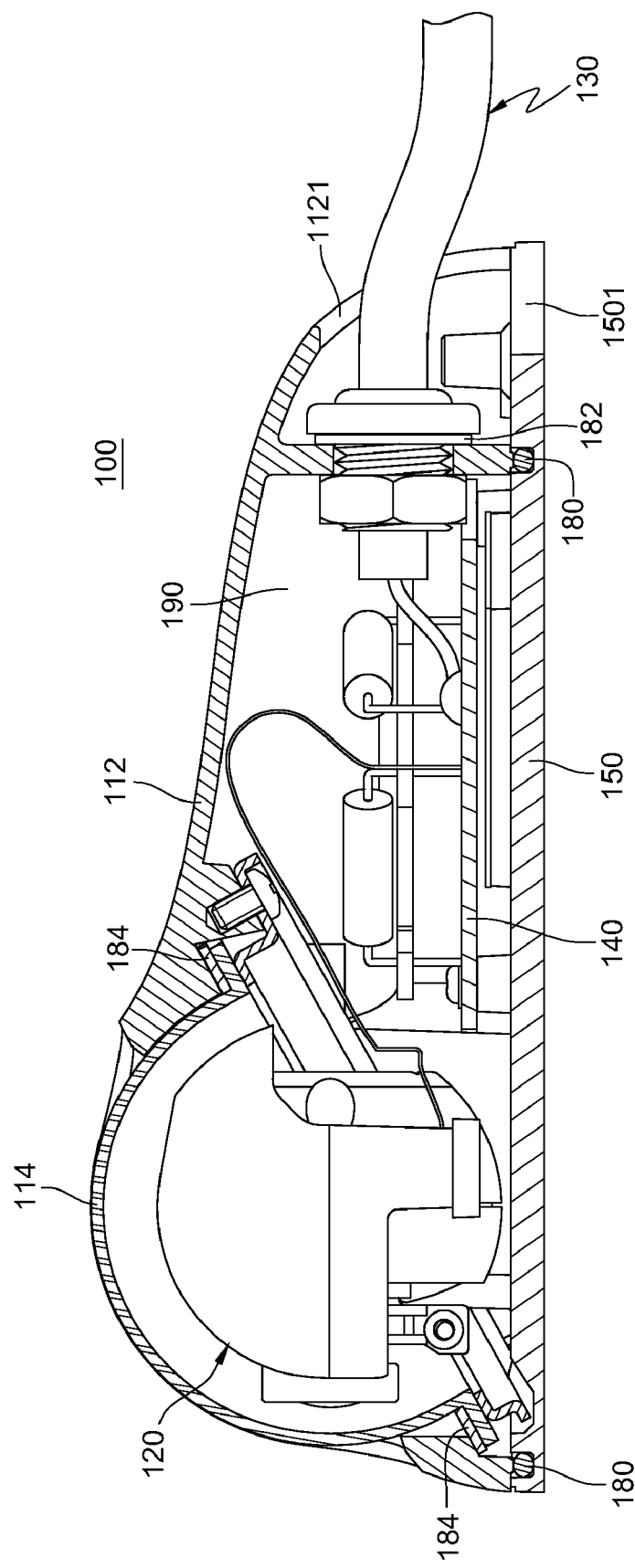
FIG. 1C is a sectional view of the photographic device as shown in FIG. 1A without a line cover.

FIG. 1A is an exploded view of a photographic device according to an embodiment, FIG. 1B is a sectional view of the photographic device as shown in FIG. 1A, and FIG. 1C is a sectional view of the photographic device in FIG. 1A without a line cover 170.

As shown in FIGS. 1A to 1C, a photographic device 100 comprises an upper cover component 110, a lens module 120, a signal line set 130, a circuit board 140, and a lower cover 150. The upper cover component 110 comprises an upper casing 112 and a transparent mask 114. The upper casing 112 has a through hole 113 which is an elongated breach. The transparent mask 114 is fastened in the upper casing 112 and disposed under the through hole 113. The through hole 113 exposes the transparent mask 114 which does not protrude from the upper casing 112. The lens module 120 is in the transparent mask 114, and the view angle of the lens module 120 can be adjusted according to the breach range of the through hole 113.

A conventional photographic lens has a function of vertical swing and horizontal swing to adjust a view angle thereof; a through hole of the conventional photographic device is mostly a round breach which is located on an upper casing of the conventional photographic device, and the transparent mask protrudes from the round breach of the upper casing to have a wide view angle. In this embodiment, however, the lens module 120 does not have the horizontal swing function and only has the vertical swing function to adjust the view angle of the lens module 120. Therefore, comparing with the round breach of the conventional product, the through hole 113 is only required to be made according to the range of the vertical swing of the lens module 120, thereby having a smaller breach range and a vertically elongated shape. In this way, the area which is exposed by the through hole 113 of the upper casing 112 of the transparent mask 114 is reduced, and the transparent mask 114 does not protrude from the outer surface of the upper casing 112. With the two points of this embodiment above, the upper casing 112 can protect the transparent mask 114 from being destroyed by the impact of a foreign object, thereby protecting the lens module 120 in the transparent mask 114.

In this embodiment, by dropping the horizontal swing function, the through hole 113 is shrunk into a vertical elongated breach. However, the disclosure is not limited thereto; for example, the lens module 120 may also keep the horizontal swing function with the vertical swing function being dropped. In this way, the through hole 113 is only required to make a breach according to the horizontal swing range of the lens module 120, and, therefore, the through hole 113 has a horizontal elongated breach range. That is, the through hole 113 may be adjusted for the size and the shape according to the swing range of the lens module 120 to achieve the minimization of the breach range of the through hole 113 without affecting the view angle of the lens module 120.

Figure 2:
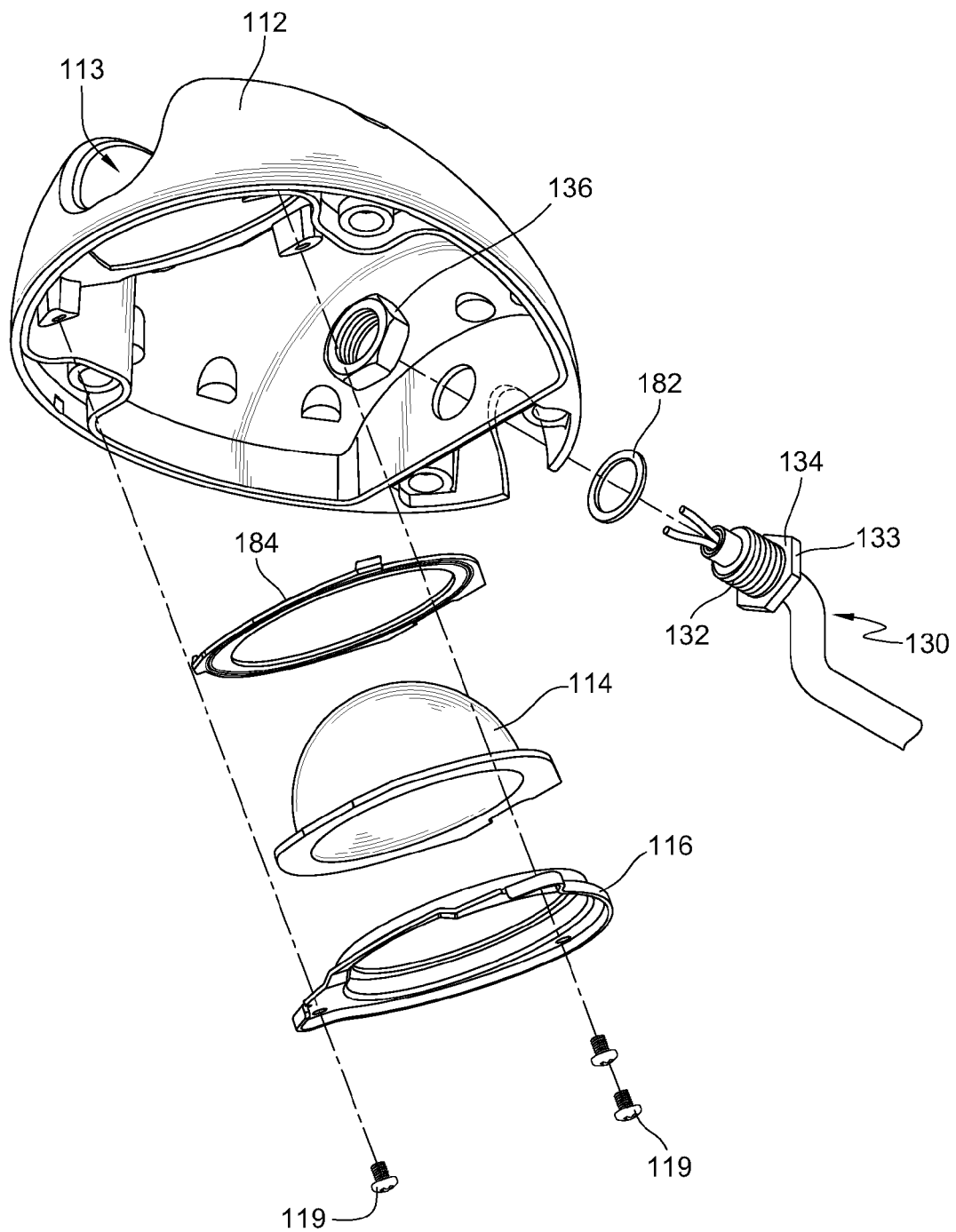
FIG. 2 is a schematic exploded structural view of an upper cover component and a signal line set of the photographic device as shown in FIG. 1A.

Next, the structure of the upper cover component 110 is described in detail with reference to the following embodiments. FIG. 2 is a schematic exploded structural view of the upper cover component 110 and the signal line set 130 of the photographic device 100 as shown in FIG. 1A. As shown in FIGS. 1A and 2, the material of the upper casing 112 may be aluminum alloy, which can provide a good impact resistance to the photographic device 100 for enduring the external collision and impact. The above material of the upper casing 112, however, is not intended to limit the disclosure, and in this embodiment, the material of the upper casing 112 may be an aluminum alloy or other materials such as steel or other impact-resistant plastic materials. The shape of the transparent mask 114 may be semi-spherical. In addition, the photographic device 100 may further comprise a first water-proof member 184 and an optical mask fixed plate 116. The shape of the first water-proof member 184 is annular, and the material of the first water-proof member 184 may be rubber. The above material of the first water-proof member 184, however, is not intended to limit the disclosure.

The first water-proof member 184 is clamped between the upper casing 112 and the transparent mask 114, and the first water-proof member 184 surrounds the through hole 113. The first water-proof member 184 and the transparent mask 114 jointly seal the through hole 113. In addition, the optical mask fixed plate 116 is also annular, surrounds the through hole 113 and is disposed on the transparent mask 114. The transparent mask 114 is screwed to the upper casing 112 by three screws 119 penetrating the optical mask fixed plate 116 and the transparent mask 114, so that the first water-proof member 184 and the transparent mask 114 are clamped between the upper casing 112 and the optical mask fixed plate 116. However, the above number of the screws 119 is not intended to the disclosure.

In this embodiment, because the first water-proof member 184 disposed between the transparent mask 114 and the upper casing 112 is made of compressible rubber, the slits at the junction between the transparent mask 114 and the upper casing 112 are sealed with the first water-proof member 184, thereby a seal effect between the transparent mask 114 and the upper casing 112 is achieved.

As shown in FIGS. 1A and 2, the signal line set 130 may be a water-proof wire, and is electrically connected to the circuit board 140. The signal line set 130 has a fixed portion 132 disposed at one end of the signal line set 130, and the fixed portion 132 is fastened to one end of the upper casing 112. The fixed portion 132 may further comprise a flange 133 having a butting plane 134 facing the upper casing 112. The photographic device 100 may further comprise a second water-proof member 182 which may be made of rubber. The above material of the second water-proof member 182, however, is not intended to limit the disclosure; for example, the material of the second water-proof member 182 may be silica gel. The second water-proof member 182 is annular, and the fixed portion 132 of the signal line set 130 pass through the second water-proof member 182. The butting plane 134 of the fixed portion 132 is disposed on the second water-proof member 182, and the fixed portion 132 penetrates from the exterior of the upper casing 112 into the interior of the upper casing 112. The butting plane 134 butts pushes the second water-proof member 182, so that the second water-proof member 182 contacts with the upper casing 112. In this way, the second water-proof member 182 is clamped between the butting plane 134 and the upper casing 112. The photographic device 100 may further comprise a screw nut 136 which fastens the fixed portion 132 of the signal line set 130 in the interior of the upper casing 112, so that the upper casing 112 and the second water-proof member 182 are clamped between the screw nut 136 and the butting plane 134.

The second water-proof member 182 disposed between the butting plane 134 and the upper casing 112 is made of compressible rubber, so that the slits at the junction between the fixed portion 132 and the upper casing 112 are sealed with the second water-proof member 182, thereby a seal effect between the fixed portion 132 and the upper casing 112 is achieved.

Figure 3:
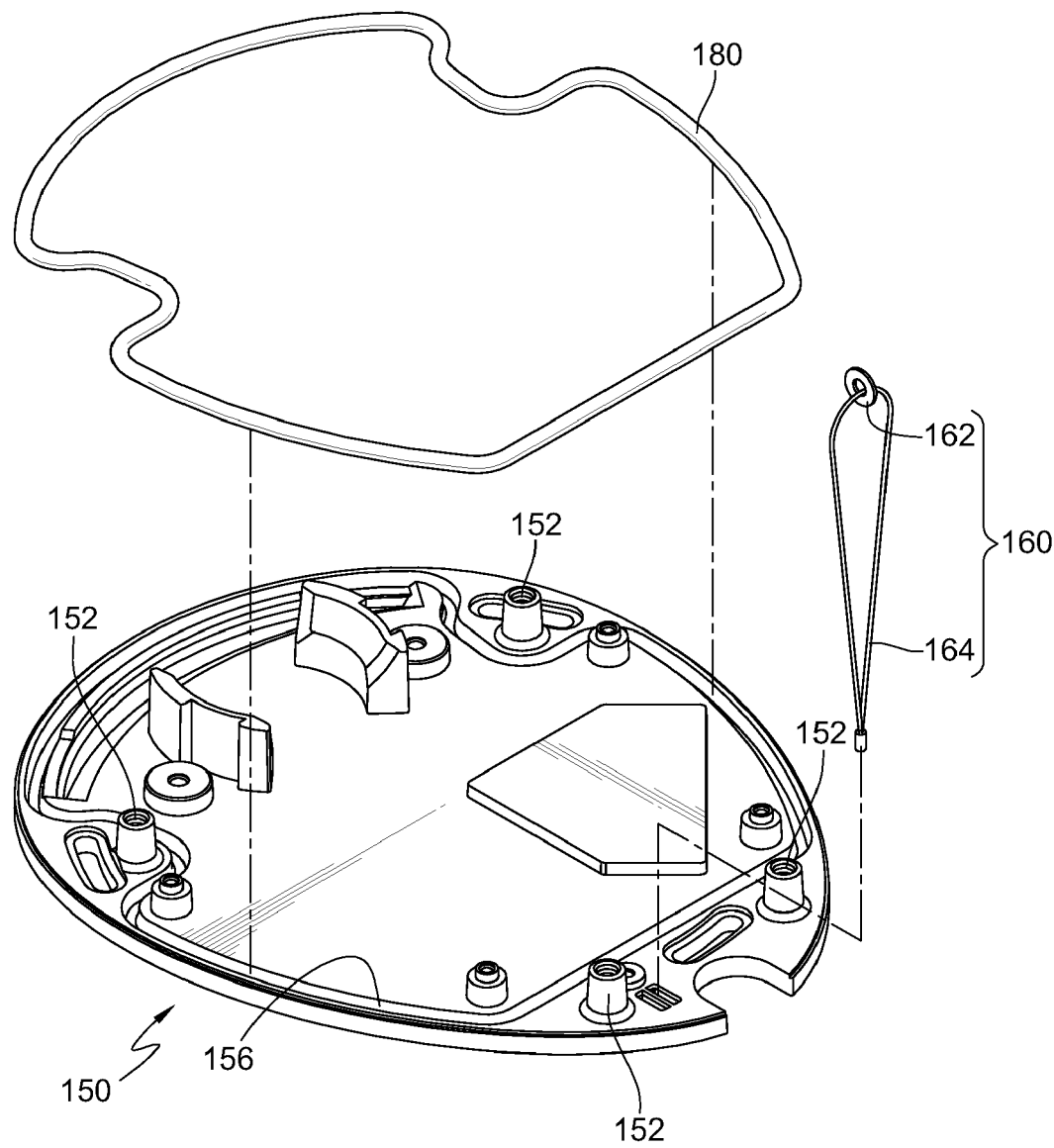
FIG. 3 is a schematic structural view of a lower cover of the photographic device as shown in FIG. 1A.

FIG. 3 is a schematic structural view of the lower cover 150 of the photographic device 100 as shown in FIG. 1A. As shown in FIGS. 1A and 3, the lower cover 150 is joined to the upper casing 112 and screwed to the lens module 120 and the circuit board 140 by a screw 123 and a screw 148. The lower cover 150 and the upper casing 112 jointly encompass the lens module 120 and the circuit board 140. The lower cover 150 has an annular groove 156 facing the upper casing 112 and disposed along the outer edge of the lower cover 150. The photographic device 100 further comprises a third waterproof member 180 which is annular and may be made of rubber. The above material of the third water-proof member 180, however, is not intended to limit the disclosure. The third water-proof member 180 is disposed in the annular groove 156 of the lower cover 150 and surrounds the lens module 120 and the circuit board 140.

In this embodiment, the lower cover 150 may further comprise four fixing structures 152, for example, a screw bolt; the fixing structure 152 is located on the outer side of the annular groove 156. The photographic device 100 may further comprise a fixing member 118, for example, a screw. The upper casing 112 may further have four screw holes 117. The fixing member 118 penetrates the upper casing 112 through the screw hole 117 and is fixed to the fixing structure 152, so that the upper casing 112 is joined to the lower cover 150. Meanwhile, the third water-proof member 180 is clamped by the upper casing 112 and the lower cover 150. The above number and the form of the fixing structure 152 and the fixing member 118 are not intended to limit the disclosure, and the fixing structure 152 and the fixing member 118 may also be snap-fit structures.

The fixing structure 152 and the fixing member 118 are located peripheral to the third water-proof member 180, which means that the fixing structure 152 and the fixing member 118 do not penetrate the accommodation space encompassed by the lower cover 150 and the upper casing 112. Moreover, the third water-proof member 180 disposed between the lower cover 150 and the upper casing 112 may be made of compressible rubber, so that the slits at the junction of the accommodation space enclosed by the lower cover 150 and the upper casing 112 are sealed with the third water-proof member 180, thereby a seal effect between the lower cover 150 and the upper casing 112 is achieved.

In the photographic device 100, the connection slits between the upper casing 112 and the transparent mask 114, the upper casing 112 and the lower cover 150, and the upper casing 112 and the signal line set 130 can be sealed by the first water-proof member 184, the second water-proof member 182, and the third water-proof member 180. This is to insure that the accommodation space 190 formed by the upper casing 112 and the lower cover 150 is a sealed space which the lens module 120 and the circuit board 140 are located, in as shown in FIG. 1B. In view of the above points, the photographic device 100 has a water-proof effect and a dust-proof effect.

As shown in FIGS. 1A and 1B, the lens module 120 further comprises a lens fixing cover 122 and a lens component 124. The lower cover 150 may further have a lens seat 154 for carrying the lens component 124. The lens component 124 comprises a photographic lens 125 disposed on the lens seat 154 and enclosed by the lens fixing cover 122. The lens fixing cover 122 is screwed to the lower cover 150 by the screw 123, which means that the lens module 120 is fastened to the lower cover 150 by the lens fixing cover 122. Moreover, the lens fixing cover 122 has a notch exposing the photographic lens 125. The photographic lens 125 may be adjusted for the direction of the view angle within the notch range of the lens fixing cover 122, and the photographic lens 125 is disposed on the lens seat 154 and faces the transparent mask 114.

Figure 4:
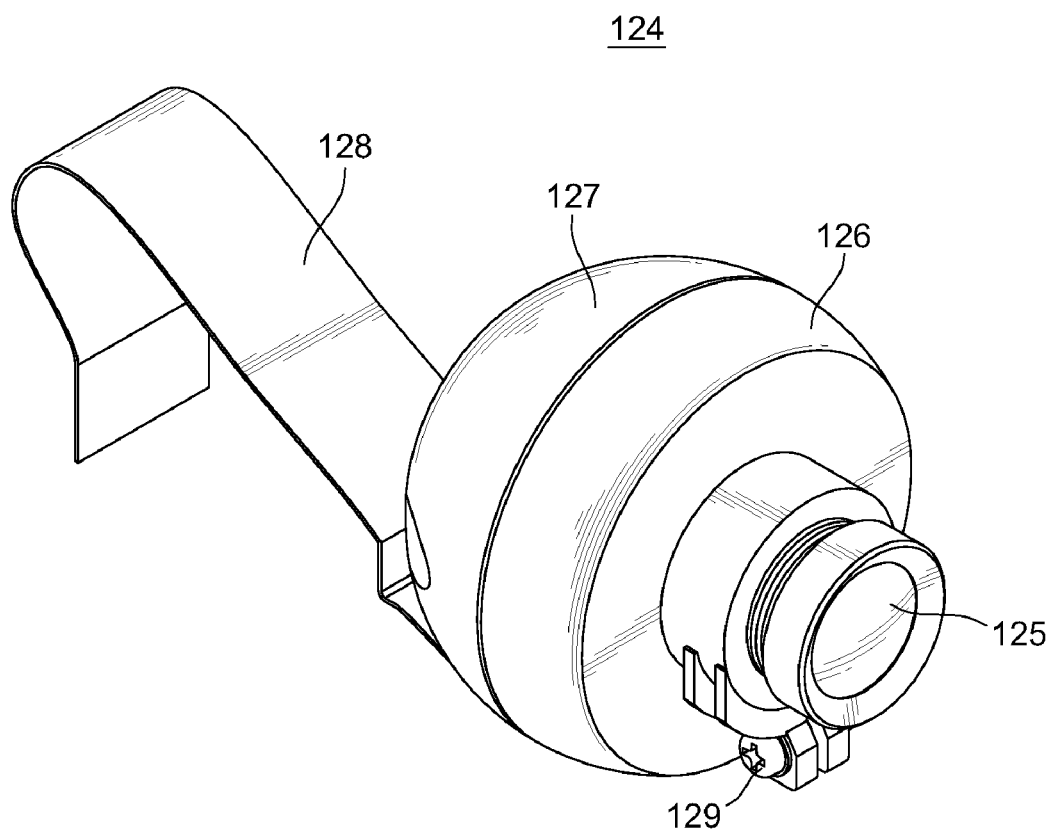
FIG. 4 is a schematic structural view of a lens component of the photographic device as shown in FIG. 1A.

FIG. 4 is a schematic structural view of the lens component 124 of the photographic device 100 as shown in FIG. 1A. As shown in FIGS. 1A and 4, the lens component 124 comprises a photographic lens 125, a lens fixing screw 129, a lens front cover fixing seat 126, a lens back cover 127, and a flexible flat cable 128. The lens fixing screw 129 is located beside the photographic lens 125, and the focal length of the photographic lens 125 can be manually adjusted after loosening the lens fixing screw 129. The lens front cover fixing seat 126 and the lens back cover 127 are located on the lens seat 154 of the lower cover 150, and the lens front cover fixing seat 126 and the lens back cover 127 jointly encompass an optical electronic unit (not shown), which is used to convert an image picture captured by the photographic lens 12 into a signal for output. In addition, the flexible flat cable 128 is respectively electrically connected to the optical electronic unit and the circuit board 140, so that an electrical connection exists between the circuit board 140 and the optical electronic unit.

As shown in FIGS. 1A and 3, the photographic device 100 may further comprise a suspension member 160. In the embodiment, the suspension member 160 comprises a washer 162 and a sling 164. The sling 164 penetrates the washer 162. A screw passes through the washer 162 and is screwed to the upper casing 112, so that the washer 162 is screwed to the upper casing 112. The sling is bound to the lower cover 150, so that a connection relation still exists when the upper casing 112 is detached from the lower cover 150. Therefore, when an operator dismantles the photographic device 100 on the ceiling, the upper casing 112 will be suspended from the lower cover 150 after the upper casing 112 is detached from the lower cover 150. Consequently, the operator can continue the operation without additionally placing the upper casing 112, and, therefore, some operation time is saved.

As shown in FIG. 1B, when the photographic device 100 is mounted on a wall having a wiring hole, the photographic device 100 may further comprise a line cover 170 made of rubber or other materials, such as an aluminum alloy or other impact-resistance plastic materials. The line cover 170 covers an upper cover wiring notch 1121 of the upper casing 112 (as shown in FIG. 1C), and the line cover 170 is sandwiched between the upper casing 112 and the lower cover 150. The signal line set 130 penetrates to the exterior of the photographic device 100 through a lower cover wiring notch 1501 and enters the wiring hole of the wall. Moreover, the line cover 170, the upper casing 112, and the lower cover 150 jointly encompass the signal line set 130, so that the signal line set 130 is not exposed and, therefore, the human-made line trimming is prevented. Furthermore, when the line cover 170 is made of impact-resistant material, for example, the aluminum alloy, a powerful protection effect against deliberate attack to the signal line set 130 can be achieved. In addition, as the line cover 170 covers the signal line set 130, the wall peripheral to the photographic device 100 has an aesthetic appearance. Thus the line cover 170 has effects of protecting the signal line set 130 and beautifying the photographic device 100.

FIG. 1C, is an embodiment in which the wall does not have any wiring hole. When the wall has no wiring hole, the line cover 170 is not required and has no use. In this case, the signal line set 130 penetrates to the exterior of the photographic device 100 through the upper cover wiring notch 1121. The photographic device 100 has the dismountable line cover 170, so that the line cover 170 can be optionally combined depending on the mount environment conditions, so as to achieve the optimum mount configuration.

In FIG. 1A, the screw hole 117 of the upper casing 112 is a through hole and may have a thread, so the fixing member 118 is screwed to the screw hole 117 of the upper casing 112 before screwed to the fixing structure 152 of the lower cover 150. In this way, when an operator dismantles the photographic device 100 on the ceiling, the operation can be continued with the fixing member 118, for example, a screw, remained on the upper casing 112, after the upper casing 112 is detached from the lower cover 150, so that some operation time is saved.

As shown in FIG. 1A, the photographic device 100 may further comprise a heat-conductive sheet 158 clamped between the circuit board 140 and the lower cover 150 and contacting with a chip (not shown) in the circuit board 140. The purpose of the heat conducting sheet 158 is to conduct heat energy generated by the chip to lower cover 150 and, therefore, prevent the chip from overheated.

According to the embodiment disclosed above, as the upper casing of the photographic device of the disclosure is made of impact-resistant material, such as the aluminum alloy, the upper casing is firm and hard to be destroyed in nature. In addition, the transparent mask is fastened under the through hole of the upper casing; the size of the through hole is according to the range of the view angle of the lens module, and the transparent mask does not protrude from the outer surface of the upper casing. Therefore, the upper casing can protect the transparent mask from being attacked by an impact and, therefore, prevent the break down of the transparent mask. Furthermore, the photographic device of the disclosure has water-proof members, for example, water-proof rubbers, so that the connection slits between the upper casing and the transparent mask, the upper casing and the lower cover, and the upper casing and the signal line set can be sealed. This can also insure that the space enclosed by the upper cover component and the lower cover is a sealed space in which the lens module and the circuit board are located. In this way, such sealing effect can provide a water-proof effect and a dust-proof effect to the photographic device to prevent the decrease of the photograph quality due to the accumulation of moisture or dust on the inner surface of the transparent mask and prevent the damage caused by the direct contact of the moisture and the dust with a circuit unit in the photographic device, thereby the service life of the photographic device is improved.

What is claimed is:

1. A photographic device, comprising:
    an upper cover component, comprising:
        an upper casing, having a through hole; and
        an transparent mask, fastened in the upper casing and disposed under the through hole, the through hole exposing the transparent mask, and the transparent mask not protruding from the upper casing;
    a lens module, comprising a photographic lens facing the transparent mask;
    a signal line set, one end of the signal line set comprising a fixed portion, and the fixed portion fastened to one end of the upper casing;
    a circuit board, respectively electrically connected to the lens module and the signal line set; and
    a lower cover, joined to the upper casing, the circuit board and the lens module fastened to the lower cover, and the lower cover and the upper casing jointly encompassing the lens module and the circuit board.

2. The photographic device according to claim 1, wherein the signal line set is water-proof, and the photographic device further comprises:
    an annular first water-proof member, clamped between the upper casing and the transparent mask, and surrounding the through hole, and the first water-proof member and the transparent mask jointly sealing the through hole;
    an annular second water-proof member, the fixing portion of the signal line set penetrating the second water-proof member, the fixing portion comprising a flange having a butting plane, the butting plane disposed on the second water-proof member, and the second water-proof member clamped between the butting plane and the upper casing; and
    an annular third water-proof member, disposed along an outer edge of the lower cover, surrounding the lens module and the circuit board, and clamped between the upper casing and the lower cover;
    wherein by the first water-proof member, the second water-proof member, and the third water-proof member, the lens module and the circuit board are sealed in an accommodation space formed by the upper cover component and the lower cover.

3. The photographic device according to claim 2, further comprising a fixing member, the lower cover having an annular groove facing the upper casing and disposed along an inner side of an outer edge of the lower cover, the third water-proof member accommodated in the annular groove, the lower cover having at least one fixing structure located on an outer side of the annular groove, the fixing member penetrating the upper casing and fixed to the fixing structure, so that the upper casing is joined to the lower cover, and the upper casing and the lower cover jointly clamp the third water-proof member.

4. The photographic device according to claim 1, wherein the upper casing is made of metal.

5. The photographic device according to claim 1, wherein the upper cover component further comprises an annular optical mask fixed plate located in the upper casing, surrounding the through hole, and disposed on the transparent mask, and the transparent mask is clamped between the optical mask fixed plate and the upper casing.

6. The photographic device according to claim 1, wherein the fixed portion of the signal line set further comprises a flange having a butting plane, the fixed portion penetrates from an exterior of the upper casing into an interior of the upper casing, the butting plane contacts with the upper casing, the photographic device further comprises a screw nut in the interior of the upper casing and fastened the fixed portion of the signal line set, and the upper casing is clamped between the screw nut and the butting plane, so that the signal line set is fastened to the upper casing.

7. The photographic device according to claim 1, wherein the lens module further comprises a lens fixing cover and a lens component, the lens fixing cover is fastened to the lower cover, the lens fixing cover encloses the lens component, the photographic lens is disposed in the lens component, the lens fixing cover has a notch exposing the photographic lens, and the lens module is fastened to the lower cover by the lens fixing cover.

8. The photographic device according to claim 1, further comprising a suspension member, two ends of the suspension member fastened respectively to the upper casing and the lower cover, so that the upper casing is hanged from the lower cover when the upper casing is detached from the lower cover.

9. The photographic device according to claim 1, further comprising a line cover, sandwiched between the upper casing and the lower cover for filling a wiring notch of the upper casing, and the line cover, the upper casing, and the lower cover jointly enclose at least a part of the fixing portion of the signal line set.

10. The photographic device according to claim 1, wherein both the upper casing and the lower cover have at least one thread hole, the thread hole of the upper casing is a through hole, the photographic device further comprises a screw, and the screw is engaged with the thread holes of the upper casing and the lower cover.

* * * * *